Oct. 24, 1939.   K. MAYBACH   2,176,916
CONTROL DEVICE FOR GEAR CHANGING MECHANISM IN MOTOR VEHICLES
Filed July 10, 1935   4 Sheets-Sheet 1

Inventor: Karl Maybach

Oct. 24, 1939.  K. MAYBACH  2,176,916
CONTROL DEVICE FOR GEAR CHANGING MECHANISM IN MOTOR VEHICLES
Filed July 10, 1935  4 Sheets-Sheet 3

Inventor
Karl Maybach,
By
Edmund N. Perry Jr.
Attorney

Oct. 24, 1939.   K. MAYBACH   2,176,916
CONTROL DEVICE FOR GEAR CHANGING MECHANISM IN MOTOR VEHICLES
Filed July 10, 1935   4 Sheets-Sheet 4
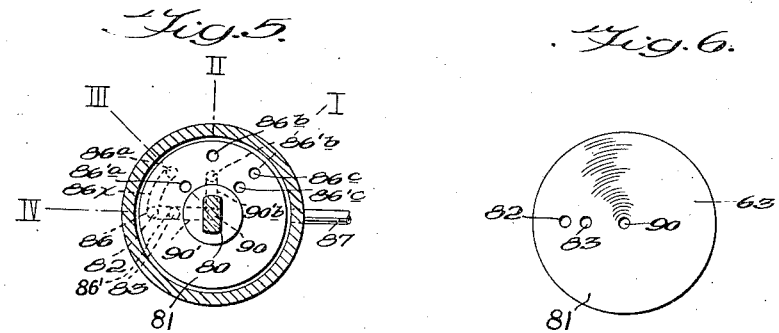
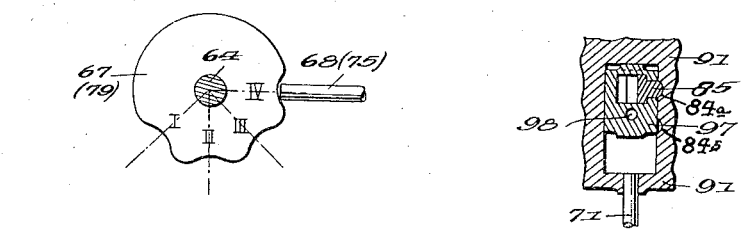
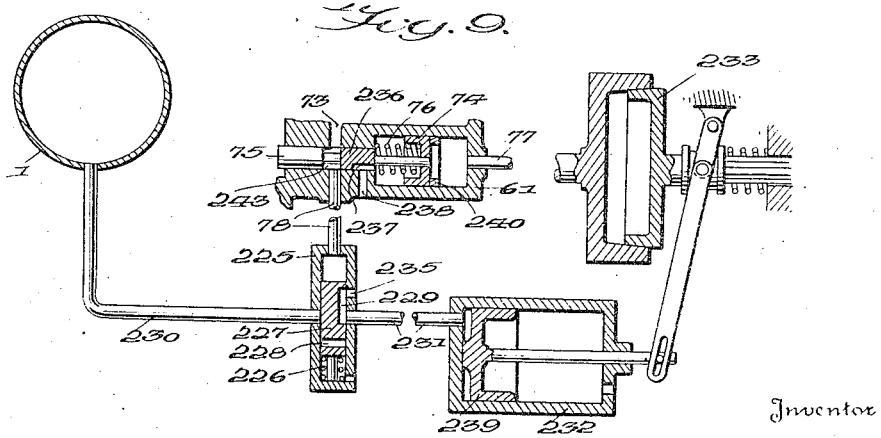
Inventor
Karl Maybach,
By Edmund W. Parry Jr.
Attorney Patented Oct. 24, 1939

2,176,916

UNITED STATES PATENT OFFICE 2,176,916

CONTROL DEVICE FOR GEAR CHANGING MECHANISM IN MOTOR VEHICLES

Karl Maybach, Friedrichshafen, Germany, assignor to Maybach-Motorenbau G. m. b. H., Friedrichshafen, Germany Application July 10, 1935, Serial No. 30,760
In Germany August 8, 1934

9 Claims. (Cl. 74—472)

My invention relates to a control device for the pressure medium of the gear shifting mechanism for change gears, particularly for power vehicles. For the control of the various transmissions there are provided servo-motors, the pressure medium operated pistons of which effect the displacement of the speed clutches provided in the gear. The admission of the pressure medium to these gear shifting motors is controlled by particular distributing members which are set during the selection of the speed in question.

For the operation of the control device according to my invention, a pressure gas or suction pressure, or a pressure fluid may be used. Pressure gas or suction pressure afford particular advantages as owing to the high flow speeds rendered possible by them, a particularly rapid action, an extraordinarily small construction of the whole device with slight weight, and simple and easy transmission, are attained.

One of the essential features of the invention is that the supply of pressure medium for actuating the gear setting mechanism for any gear selection is controlled by a service lever, as for example the gas lever controlling the vehicle motor speed, the distinguishing feature of the arrangement being that the operating pressure is supplied during movement of the service lever in either or both directions of its operation. When the service lever is at rest in one or the other of its end directions, operating pressure can not be supplied to the gear shifting mechanism. Each speed can be preliminarily selected by suitable setting of the pressure distributor members. The actual shifting will occur only when the service lever is thereafter moved. Where the gas pedal constitutes the particular service lever, operating pressure will be momentarily supplied to effect operation of the gear shifting mechanism during movement of the pedal to idling position or from idling position, or in both instances. Thus it is possible for a speed to be preselected when the gas pedal is in idling position, and the shifting operation will be effected when the pedal is depressed to speed up the vehicle motor.

Preferably a control member for the pressure medium operating the gear shifting mechanism is displaced, where the gas lever is employed, during the movement of the gas lever in the last small part of its travel in front of the rest or idling position, by which member the control of the pressure medium for the control pistons is set either indirectly or directly.

By the control of the pressure medium so that the same is supplied to the gear shifting mechanism only momentarily at some point in the movement of a service lever of the motor vehicle, the pressure medium losses are reduced to the minimum, as pressure medium is present in the control passages and at the control cylinders only when the control operation commences and only so long as this operation lasts. If after the selection of a speed it is seen that this speed should not be set, it is always possible with a control device according to my invention, so long as the pressure medium has not yet been transmitted to the gear shifting motors by movement of the service lever, to cancel the setting forthwith, or without setting the speed which is not required, change at once to another speed. Consequently no wrong controls or damages can occur, as the control passages for the originally selected, but not actually set, speed have not yet been filled with pressure medium.

The distributing members which control the pressure medium to be admitted to the servomotor pistons may be mechanically moved. Particular advantages result from these distributing members being moved by pressure medium which is preferably, also controlled by the member controlling the admission of pressure fluid to the servomotors.

According to my invention the arrangement is such that the control force dependent upon movement of a service lever of the vehicle, for setting the pressure medium passages to the control pistons, acts only a short time. The force is, according to my invention, subsequently immediately released by a control force which in dependence on the control operation, is operative during a portion of the control operation or during the whole time in which the control operation takes place. This construction results in particularly small pressure medium losses.

The device according to my invention may be employed with particular advantages for change speed gears of the type employing overrunning clutches, especially alternately controlled claw clutches the claw end faces of which are so inclined that during the approach of the claw halves towards each other which starts the control, these inclinations repel the clutch halves from each other until one clutch half begins to run more rapidly than the other clutch half (disclosed in my U. S. Patents reissue 17,709 and Nos. 1,949,167 and 1,949,168). With the mechanical or pressure medium operated control devices dependent on the gas lever hitherto employed for these gears, there is provided a spring device by which after the cutting off of the gas by the operator, the originally engaged clutch is disengaged. The device according to my invention has amongst others also the advantage that such spring devices are no longer required. With such gears having overrunning clutch, known auxiliary devices may be provided by which during the repelling period of the claws, one clutch half is retarded or accelerated in order to attain as rapidly as possible the overrunning number of revolutions so that the control operation is effected as rapidly as possible, as disclosed for example in my U. S. Patents Nos. 1,891,678 and 1,883,743. With such auxiliary devices a pressure medium is frequently used for operating the device for retarding or accelerating one clutch half. The same pressure medium may then, according to my invention, effect during the repelling period the control of the pressure medium supply to the gear changing servomotors of the transmission. As soon as the repelling period terminates, and the required gear selection is set, the control of the pressure medium admitted to the servomotor pistons is reversed by the pressure medium controlled by the auxiliary device. The pressure medium therefore acts only until the repelling operation is terminated and consequently the corresponding gear selection is set.

The admission of the pressure medium to the distributing members is, according to my invention, moreover effected under the action of a control member which is set on selecting the speed. If, therefore, the vehicle service lever is actuated without another speed having been previously selected, under which conditions no operation of the gear shifting mechanism is required, this control member prevents the pressure medium being unnecessarily admitted to the actuating pistons of the gear shifting mechanism because of the dependency of such member on operation of the speed selecting mechanism.

On driving with a vehicle provided with a device, according to my invention, in a great ascending gradient it may happen that the pressure medium is supplied to shift the gears to a new speed while the vehicle motor imposes a heavy load on the gear transmission parts in propelling the vehicle. In this case the pressure medium action might in some cases not suffice to move the movable clutch half out of engagement. For this reason an auxiliary device is provided according to my invention by which on cutting off the gas the main clutch of the vehicle is disengaged for the purpose of facilitating the disengaging of the claw clutches. This clutch may then, subsequently, if required, be immediately re-engaged.

Further details of the invention are given in the following description of two constructional examples.

In Fig. 1 is illustrated a simple, diagrammatically indicated, constructional example showing the basic construction of a device according to my invention in partial section, in which the distributing members for the pressure medium admission to the control members are mechanically moved.

Fig. 5 shows the details of the distributor valves in the embodiment of Fig. 2;

Fig. 6 shows the details of the stationary member cooperating with the distributor valves;

Fig. 7 illustrates the construction of the gear selecting cams in Fig. 2;

Fig. 8 is a fragmentary sectional elevation showing the details of certain parts in Fig. 2; and Fig. 9 is a diagrammatic view showing an auxiliary arrangement according to the invention for releasing the main clutch of the vehicle to facilitate the disengagement of the clutches of the transmission.

Figure 1:
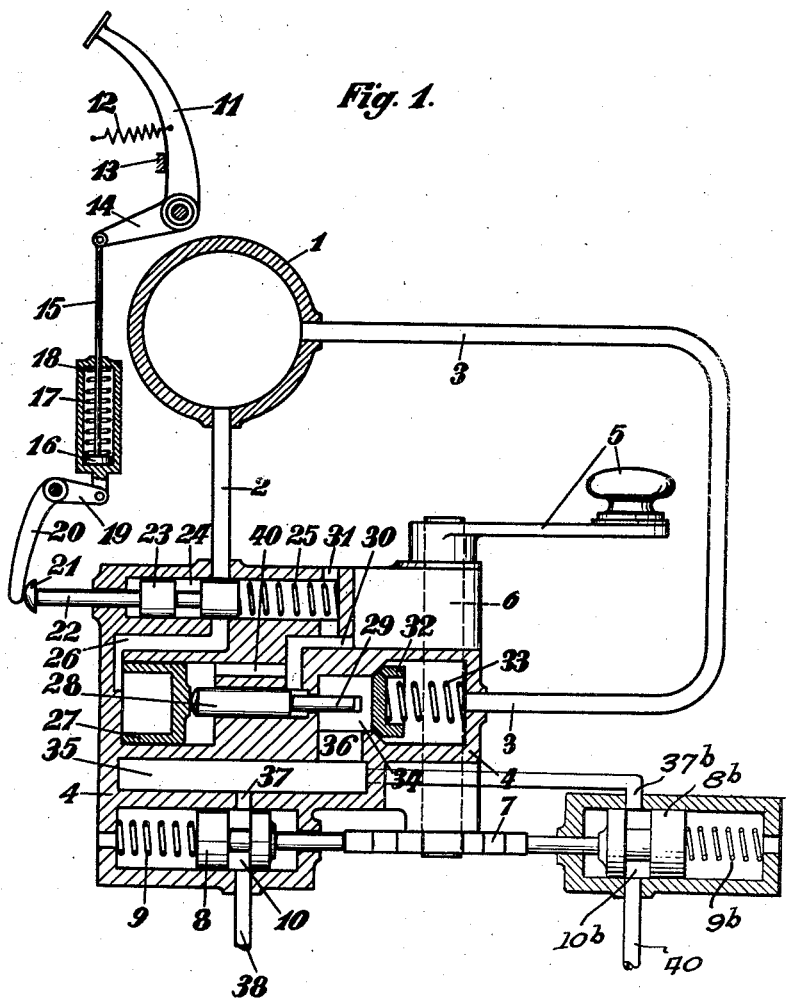

In Fig. 1, 1 indicates a pressure medium reservoir, 2 and 3 supply pipes to the control casing 4, 5 a hand lever which is connected by shaft 6 with the selector disc 7. 8 is a control member acted upon by the pressure of the spring 9, which control member has a groove 10. 11 is the gas pedal lever which is drawn by the spring 12 against the stop 13 and possesses an arm 14 to which latter is linked by a rod 15, a piston 16 which is connected by a spring 17 with a cylinder 18. The latter is connected with one arm 19 of a lever, the other arm 20 of which bears against a knob 21 of a pin 22 of a slide valve 23 which latter has a groove 24 and is loaded by the spring 25. 26 is a passage in the casing 4 which leads to the space at the left of a piston 27 which latter is in connection with a pin 28 which possesses an extension 29. 30 and 40 are each a further passage in the casing 4, 31 an air communication opening. 32 is a stop valve which is maintained closed by a spring 33. 34 and 35 are spaces in the casing 4 which communicate with each other by a passage 36. With the space 35 communicate bores of which one (37) is illustrated. Pipe 38 leads to one of the gear shifting motors of the change gear.

The slide valve or control member 8 has a longitudinal groove 216 therein which when the valve is in its right end position vents pipe 38 to the atmosphere through opening 217 in the valve casing.

In Fig. 1 the pressure control member 8 previously referred to and the similar pressure control member 8b constitute two of a series of pressure distributing members which are selectively operated by cam 7 through the hand lever 5 in order to obtain different gear selections. The number of pressure distributing members will depend upon the number of gear shifting motors to which pressure is to be distributed, and the number of servomotors will in turn depend upon the number of gear selections in, and the type of, the particular transmission with which the invention is to be employed.

Figures 3, 4:
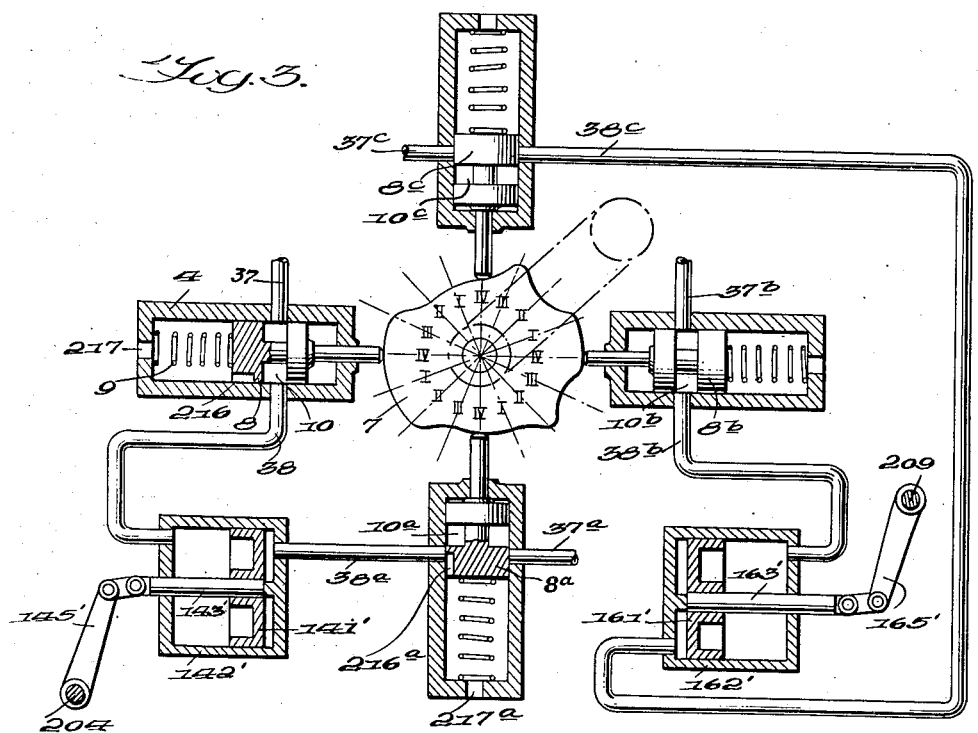
Fig. 3 is a diagrammatic view supplementary to Fig. 1 showing the pressure distributing members and the gear selecting cam which operates the same, and further illustrates one way in which the distributing members may be employed with a pair of servomotors for transmission such as shown in Fig. 4.
Fig. 4 shows a 4-speed transmission employing claw clutches, and serving to explain the utility of the several embodiments of the invention as shown in Figures 1 and 3, and in Fig. 2.

In Fig. 3 is shown an arrangement of four similar pressure distributing valves arranged to operate two servomotors. Slide valve 8, shown in Fig. 1, serves to supply pressure received from space 35 through port 37 through its groove 10 and pipe 38 to the left end of piston 141' of servomotor 142'. Paired with valve 8 is a second valve 8a serving to supply pressure received from space 35 through port 37a to the right end of piston 141' of the same servomotor through pipe 38a. The second pair of slide valves 8b and 8c serve to distribute pressure through their respective pipes 38b and 38c to the right and left sides of piston 161' of the second servomotor 162'.

Cam 7 is marked in Fig. 3 to indicate the cam portions which control the positions of each of the slide valves for four different gear selections. The various valves are arbitrarily indicated in Fig. 3 to produce the fourth speed in a transmission. Pressure is supplied through valve 8 so that piston 141 has moved to its right position while valve 8a allows the right hand side of piston 141 to be vented to the atmosphere through pipe 38a, groove 216a and openings 217a. At the same time pressure is supplied from port 37b through valve 8b and pipe 38b to the right end of piston 161' to cause the same to assume its left end position, while the left side of piston 161' is vented to the atmosphere through pipe 38c and the groove in slide valve 8c.

In the third speed position of cam disc 7, the pair of valves 8 and 8a remain unchanged so that piston 141' is in its right end position as in the case of fourth speed. The positions of the valves 8b and 8c of the other pair are shifted from that shown in Fig. 3. Valve 8b cuts off the supply of fluid pressure and vents the right side of piston 161' through pipe 38b, while valve 8c allows fluid pressure to be supplied from port 37c through pipe 38c to the left side of piston 161'. Accordingly, in third speed piston 161' assumes its right end position.

In second speed valve 8 closes and valve 8a opens to cause piston 141' to assume its left end position. At the same time valve 8b will be open and valve 8c closed so that the piston 161' will assume its left end position as does piston 141'.

In first speed, as in second speed, valve 8 will be closed and 8a opened, piston 141' being in its left end position. At the same time, valve 8b will be closed and valve 8c opened, piston 161' assuming its right end position.

The operation of the device according to Figs. 1 and 3 is the following:

The various parts are shown in the position which they assume in the rest position of the gas lever 11. During the preceding drive with gas or also during the rest position of the gas lever, the selector disc 7 has been so turned by means of the hand lever 5 in accordance with the speed to be set, that by the corresponding cam of the selector disc 7 the control slide valves 8, 8a, 8b and 8c have been brought into the illustrated positions above explained.

If the selection of the speed has been effected in the rest position of the gas lever, the slide valve 23 will upon the following admission of gas be moved during a small part at the beginning of the gas lever stroke, from the shown left into its right hand end position against the pressure of the spring 25, in which position the left portion of the control slide valve closes admission from the pipe 2. During this movement the pipe 2 leading from the pressure medium container 1 is connected for a short time with the passage 26 so that pressure air enters behind the piston 27 and moves the pin 28, 29 to the right. and consequently the pin 28, 29 to the right. Thereby valve 32 is opened so that pressure air passes from the pipe 3 through 34, 36, 35, 37, 38 to the servomotor piston corresponding to the selected speed. After a limited time the pressure at the left of piston 27 escapes by reason of leakage around the piston and through vent 30 and/or vent 31, assuming of course that slide valve 23 has cut off the pressure supply from line 2. Valve 32 accordingly closes under the action of its spring and piston 27 and pin 28 return to their left end position.

If the selecting movement occurs during drive with gas, then, in similar manner as just described, also upon returning the gas lever into the rest position, through groove 24 of slide valve 23 upon sliding over the admission opening of the pipe 2, presure medium supply to the piston 27 and consequently presure medium admission by the valve 32 will be opened, and the selected speed will be set on cutting off the gas supply, in the same manner as above described.

Figure 2:
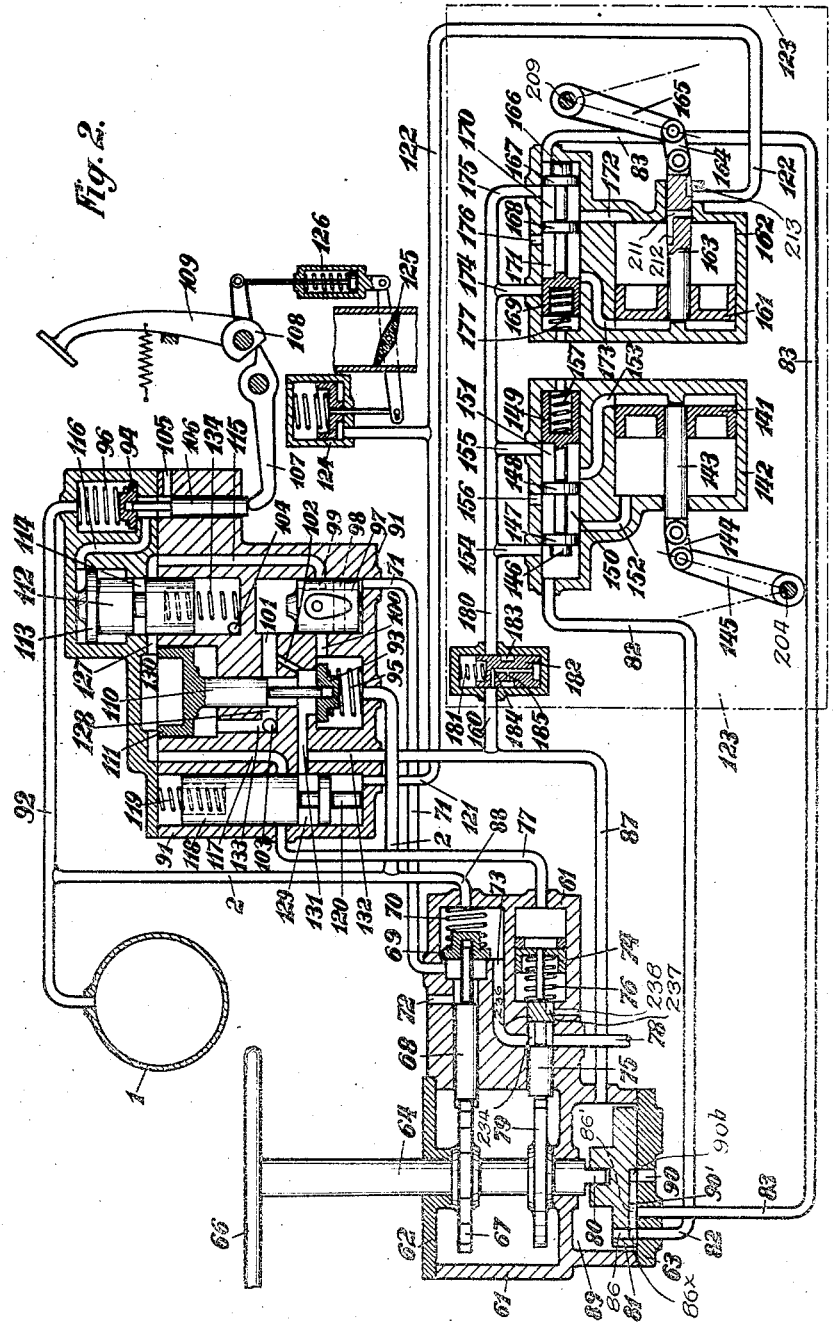
Fig. 2 shows a further constructional example likewise in partial section in which the distributing members are operated by pressure air.

In the constructional example according to Fig. 2, 61 is the casing of the speed selector, which is closed at its upper and lower ends by covers 62 and 63. Upon the shaft 64 of the speed selector, which is set through any suitable connection by means of a small hand wheel 66 mounted on the steering post column or elsewhere convenient to the driver is arranged a cam disc 67 which moves a slide pin 68. 69 is a stop valve loaded by a spring 70, for the pressure air entering from the branch pipe 88 connected to the pipe 2. 71 is a pipe connected in rear of valve 69, 72 an air communication opening, 73 an angular passage which leads pressure air coming from pipe 88 to the slide pin 75 connected with the piston 74, which pin is under the action of the spring 76. 77 is a connection pipe to the casing 91 containing the control parts.

The slide pin 75 is moved by cam disc 79 on shaft 64. Cam discs 67 and 79 are constructed in a manner known to the art. For use with a four speed transmission the same may take the form illustrated in Fig. 7.

A carrying member 80 is disposed at the lower end of speed selector shaft 64 connecting with a rotary valve distributor disc 81. Such disc through rotation of shaft 64 is turned over a stationary plate 63 through which extend the open ends of pipes 82 and 83, and provided with a circular vent opening 90. These parts are best shown in Figs. 5 and 6.

The number of pipes opening through plate 63 will be determined by the number of gear shifting servo motors to be operated. In the arrangement illustrated, two pipes 82 and 83 are represented, the same serving to supply pressure medium to and provide for the escape of pressure from the servo motors under control of the distributor disc 81.

In distributor 81 are a series of ports 86, 86a, 86b and 86c, representing four different speed selections, and adapted to be selectively brought into registry with the opening of pipe 82 in plate 63. A corresponding set of valve ports 86', 86'a, 86'b, and 86'c are arranged in the disc to register with a pipe 83. Ports 86 and 86', as shown in Fig. 2, do not extend through the disc, but are connected with each other, and put in communication with the exhaust vent 90 in plate 63 through passage 90'. The same is also true of port 86a which connects with port 86 through passage 86x, and which through passage 86x and passage 90' can be put in accommodation with port 90. Port 86'b also extends only a portion of the way through the disc and is put in communication with vent 90 through passage 90'b. The remaining ports 86'a, 86b, 86c and 86'c extend completely through distributing disc 81 so that the pressure medium from space 89 above the distributor disc and supplied through pipe 87 can be distributed to pipes 82 and 83.

It will be evident from Fig. 5 that in the fourth speed position indicated, pipes 82 and 83 are both vented to the atmosphere through ports 86, 86', passage 90' and vent 90. In third speed position pipe 82 is vented to the atmosphere through port 86a, passage 86x and 90', and vent 90. At the same time pressure is supplied from space 89 to pipe 83 through port 86'a. In second speed position port 86b registers with pipe 82 to supply pressure medium thereto, while at the same time pipe 83 is vented through port 86'b, passage 90'b and vent 90. In first speed pressure is simultaneously supplied to both pipes 82 and 83 through the respective ports 86c and 86'c.

Pipe 78, connected to the source of pressure medium through passage 73, and lines 88 and 2, is controlled by slide valve 75. Such pipe leads to a device operating the vehicle clutch, so that the vehicle clutch may be disengaged on cutting off the gas for the purpose of facilitating the operation of the gear shifting motors where, as in the transmission hereafter referred to, claw clutches are employed to obtain different gear selections. In such cases as pointed out in an earlier part of the specification conditions may sometimes be met wherein the claw clutches do not disengage readily, and the pressure medium operating the gear shifting motors prove temporarily inadequate.

One arrangement utilizing pipe 78 is shown in Fig. 9. The supply of fluid medium from the tank is conducted through lines 230 and 231 to actuate piston 239 of the operating motor 232 of the vehicle clutch 233. Interposed between lines 230 and 231 is a casing 225 having therein a slide valve 227 provided with a bore 228. The valve is urged upwardly by a spring 226. Pipe 78 communicates with the upper end of the casing. When valve 75 controlled by cam disc 79 of the selector mechanism is opened pressure is supplied to the upper end of the casing to force slide valve 227 into the lower position as shown. At such time line 231 is vented through groove 229 and vent 235. At such time piston 239 is in its left position and clutch 233 is engaged through the usual clutch spring. When the selector cam disc 79 is temporarily in position to cause slide valve 75, pipe 78 is vented to the atmosphere through grooves 237 in valve 75 and vent 238. The clutch control valve 227 is then moved upwardly by its piston to establish communication through lines 230 and 231 through bore 228. Piston 239 of the clutch motor is then moved to its right end position to disengage clutch 233. The vehicle clutch is disengaged only during gear shifting operation, at which time presure is supplied to pipe 122, and therethrough to the gear shifting servomotors, hereafter to be explained. At such time valve 118 is in its upper position permitting the passage of pressure through pipe 77 to piston 74. The movement of piston 74 to its left end position causes slide valve 75 to shift to the left, thus cutting off the supply of pressure through line 78, and, as above explained, venting valve casing 225 so that air pressure is supplied to disengage the clutch operator. After gear shifting has been completed passage 122 is vented, as hereafter to be explained. Slide valve 118 thereupon moves to its lower end position. The pressure to piston 74 is accordingly cut off. Slide valve 75 moves to its right position under the action of spring 76 against piston 74 and pressure is supplied through passage 73 and pipe 78 to depress valve 227, thereby venting the clutch operating motor 32 and allowing the clutch to re-engage.

To the lower part of the casing 91 is connected pipe 2, to the upper part the branched off pipe 92. 93 and 94 are pressure air valves which are loaded by the springs 95 and 96. 97 is a slide corresponding to the control slide valve 23 of Fig. 1, which is held in its two end positions by suitable locking, such as spring loaded bolts having a curved front face adapted to cooperate with adequately shaped recesses, as are well-known in the art. Slide valve 97 possesses a cross passage 98 as well as a groove 99. A representative construction of slide valve 97 is shown in Fig. 8. A spring-pressed bolt or finger 85 is disposed in the valve. In the upper position of the valve the pin engages a recess 84a in the wall of the casing 91 and when the valve is in its lower position engagement is made by the finger with recess 84b. Under the slide valve 97 opens the pipe 71, coming from the speed selector. To the space under the valve 93 is connected a passage 100 which opens at the slide valve 97. 101 and 102 are passages in the casing 91. 103, 104 and 105 are bores which effect communication with the outer air. The valve 94 is moved by the pin 106 which can be lifted by the gas lever 109 by means of the lever 107 and the cam 108. The valve 93 is moved by the pin 110 which is connected with the piston 111. By the passage 133, the space under the piston 111 is in connection with the outwardly leading bore 103 to which latter is connected passage 128. Into the space 130 above the piston 111 opens a communication passage 127 which leads to the slide valve 112. The latter has at its upper end a disc shaped projection 113 and moreover a groove 114. From below the slide valve 112 is loaded by the spring 134. The two slide valves 97 and 112 are connected by the passage 115. The space provided above the disc 113 of the slide valve 112 is in communication with the guide bore of the slide 106, via passage 116.

From the space above the piston 111 leads a passage 117 to a further slide valve 118 which latter is loaded at its upper end by a spring 119 and possesses a groove 129 and at its lower end an extention pin 120. 131 is a communication passage to passage 132 to which latter is connected pipe 87. Into the space under the slide valve 118 leads a pipe 121 which is conneeted to a pipe 122. Such pipe leads to cylinder 124 of an auxiliary device for moving throttle valve 125, and also leads to one of the gear shifting servomotors, in the manner and for purposes hereafter to be explained.

In the embodiment illustrated in Fig. 2, two gear shifting servomotors 142 and 162 are shown having pistons 141 and 161, piston rods 143 and 163 operating through links 144 and 164 to shift levers 145 and 165. Such levers are connected to shafts 204 and 209 which serve to effect the different gear selections of a transmission such as shown in Fig. 4. In the cylinders are moreover provided slide valves 146 and 166 which possess in addition to ring pieces 147 and 148 or 167 and 168, as well as 149 or 169, grooves 150 and 151 or 170 and 171. The passages 152 and 153 or 172 and 173 provided in the cylinder connect the spaces of the slide valves with the cylinder spaces lying in front and in rear of the two pistons 141 and 161. To the casing portions of the cylinders which contain the slide valves are connected on the one hand the conduits 82 and 83 which come from the speed selector, and on the other hand the conduit branches 154 and 155 as well as 174 and 175 which latter branch from a common conduit 180. Between the conduit 160 coming from the conduit 87 and the conduit 180 is interposed a slide valve 182 loaded by a spring 181, which has a groove 183 as well as an angular channel 184 which latter is in communication with groove 183 via a small cross passage 185. The operation of such valve is hereafter explained. 156 and 176 are air communication openings.

The mode of operation of the device according to Fig. 2 is the following:

In the drawings the individual parts are shown in the position assumed in the rest position of the gas lever. As the pin 106 is in its lower position the valve 94 is closed. The space above the disc 113 is therefore connected with the outer air through passage 116 and air communication bore 105, and the slide valve 112 is in its upper end position under the action of spring 134.

On turning the hand wheel 66 the valve 69 is opened against the force of spring 70, by means of the cam disc 67 by the pin 68. Consequently pressure air passes through conduit 71 under slide valve 97 which latter is thereby displaced into its upper position and is in this position held for instance by finger 85, as shown in Fig. 8.

By the movement of the slide valve 97 into its upper end position, pressure air passes from the conduit 2 into the passage 115 through passage 100 and the bore 98 of the slide valve 97.

The selective adjustment of the distributor disc 81 through hand wheel 66 brings one of the valve ports 86, 86a, 86b, 86c into registry with pipe 82, while at the same time registry is established between pipe 83 and one of the series of ports 86, 86'a, 86'b, 86'c. In certain gear selections pressure will be supplied through line 82 to force slide valve 146 into its right end position, at which time pressure medium from line 180 will act through passages 155 and 153 to move piston 141 into its left end position. When line 82 is vented through port 90 in plate 63, slide valve 146 is moved to its left end position through spring 157 and pressure is supplied through passages 154 and 152 to move piston 141 into its right end position. Through a corresponding arrangement pressure supplied through line 83 forces slide valve 166 into its left end position which results in the movement of piston 161 into its right end position. When line 83 has vented valve 166 moves to its right end position under actuation of spring 177 and pressure is supplied to move piston 161 into its left end position.

As soon as the driver admits gas, the bore 105 is closed by the pin 106 and thereby the connection with the outer air is interrupted. Simultaneously, the valve 94 is lifted so that pressure air from the conduit 92 passes through passage 116 above disc 113 of the slide valve 112 and depresses the latter into its lower position. So long as gas is admitted the slide valve 112 is held in its lower position by the pressure air admitted above the slide valve. When the connecting passage 127 is momentarily opened during the downward movement of slide valve 112, the pressure air contained in the passage 115 passes above the piston 111, presses the same downwards, closes at the same time by means of the pin 110 the small passage 128 leading to the air communication bore 103 and lifts the valve 93. Consequently, pressure air passes through the conduit 87 into the space 89 and from there in accordance with the selected speed setting of the distributor disc 81 into one or the other, or both of, the conduits 82 and 83 leading to the control cylinders 142 and 162 of the change gear.

At the same time pressure air passes through the inclined passage 102 and the passage 101 above the slide valve 97 which is thereby displaced back into its lower position in which the passage 115 is filled via longitudinal groove 99 and passages 101 and 102 again with pressure air.

The setting in the gear takes place in such a manner that pressure air is admitted to the casing of the slide valve 146 in the cylinder 142 through conduit 82, and slide valve 146 is thereby displaced into its right hand end position in opposition to the force of spring 157. No pressure air is admitted to the slide valve 166 by the corresponding conduit 83, as the latter is in communication with the outer air by the groove 90' and the bore 90. The slide valve 166 remains therefore in the right hand end position assumed under the force of the spring 177.

By the conduit 160 connected to the conduit 87, pressure air passes to the slide valve 182 through its angular passage 184 into the space under this slide valve, and displaces the slide in opposition to spring 181 into its upper end position. The passage 184 is so dimensioned that the movement of the slide valve 182 in the upward direction is retarded relatively to the control movement of the slide valve 146.

In the upper position of the slide valve 182, this slide valve passes the presure air coming from the conduit 160 via its annular space 183, to the conduit 180, the presure air being simultaneously passed, as before under the slide valve 182 through the small passage 185 connected with the angular passage 184, and the slide valve 182 is thereby held in its upper position. From the conduit 180 pressure air passes into the branches 154 and 174. It therefore assists at the slide valve 146 to hold the slide valve in its right hand position, whilst at the slide valve 166 further passage is closed by the end piece 169. Moreover, through the passages 155 and 175 the pressure air passes from the conduit 180 at the cylinder 142 through groove 151 of the slide valve 146 and the passage 153 to the space on the right of piston 141, and at the cylinder 162 through groove 170 of slide valve 166 and the passage 172 into the space on the right of the piston 161. The piston 141 is displaced by the action of the pressure air into its left hand end position, and the previously engaged claw clutch is disengaged and the claw clutch corresponding to the speed to be set is engaged by means of 143, 144, 145. The piston 161 is held by the admitted pressure air in the assumed left hand end position. By this means the selected speed is set.

The described arrangement is particularly used with gears having overrunning claw clutches in which, for instance, the end faces of the claw teeth are so inclined that engagement occurs only upon the slower running clutch half being overrun by the more rapidly running clutch half, and in which auxiliary devices of known kind are provided by which during the repelling period one clutch half is retarded or accelerated. With such gears, the conduit 122 is connected to a conduit conveying the controlled pressure medium, of the appertaining auxiliary device. The conduit 122 leads to the cylinder 124 the piston of which operates the throttle valve 125, the spring device 126 built into the normal gas linkage permitting of a movement of the throttle valve without movement of the gas pedal lever 109. Conduit 122, as shown in Fig. 2, also connects with a portion of the gear shifting motor 162 opposite piston rod 163. Disposed in the piston rod is a bore 211 communicating with a longitudinal groove 212. There is also a second longitudinal groove 213. When pressure is supplied from line 180 to the right hand side of piston 161 and the piston has been moved sufficiently far to the left to bring one clutch half in the transmission into preliminary rattling engagement with a preceding clutch half, line 122, is connected with the chamber on the right of piston 161 through bore 211 and groove 212. Pressure is accordingly supplied from the piston chamber through line 122. Such pressure acts on piston 124, and simultaneously through line 121 on slide valve 118. Through the movement of slide valve 118, passages 131 and 117 as well as passage 77 are connected together, while through the upward movement of piston 124 the throttle valve 125 is opened to a certain extent to speed up the motor and increase the rotational rate of the preceding clutch half. This enables the clutch halves to be brought into final clutching engagement for the desired gear selection in the transmission, piston 161 then moving into its left end position. As soon as piston 161 has reached the latter position, line 121 is vented to the atmosphere through groove 213. The reduction in pressure in such line causes slide valve 118 and piston 124 to return to their lower end positions through the action of their springs. Throttle valve 125 is again closed and the shift operation therewith terminated. By the pressure in the conduit 121 as just explained the slide valve 118 is displaced upwardly and by the groove 129 of this slide valve the passage 131 is connected with the passage 117, so that pressure air admitted by the valve 93 can also pass above the piston 111. The valve 93 is therefore held open by the pressure released by the valve until the pressure existing in conduit 121 disappears and the slide valve 117 moves back into its lower position, that is, so long as the repelling condition of the engaged claw clutch of the gear lasts.

So long as slide valve 118 remains in its upper position pressure is transmitted through conduit 77 to the space at the right of piston 74. Such piston against the action of spring 76 moves to the left to shift pin 75 which connects with the piston into a notch of disc 79. This prevents during the control operation proper, a new selecting movement being made, by which disturbances might occur. After the selected speed has been set, the various parts (slide valve 118, valve 93, piston 111, slide valve 97) are back in their original positions and are if required ready for a new setting. The slide 112 valve is either in its lower or in its upper position dependent on whether gas is being admitted or the gas lever is in its rest position.

The operation of the embodiments of Figs. 1 and 2 has been explained with reference to a pair of gear shifting servomotors. As previously mentioned the illustrative arrangements disclosed are intended for use with a four-speed transmission utilizing therein claw clutches for attaining the different gear selections. Such a representative transmission, familiar to the art, is shown in Fig. 4. Here three pairs of gears are provided with alternately acting clutches 201 and 202 between the first two pairs of gears, and a double claw clutch 207 between the second two gears of the main shaft train. Clutches 201 and 202 are operated through lever 203 fixed to a rotatable operating shaft 204. Clutch 207 is actuated through lever 208 carried by rotatable operating shaft 209. It will be understood from Fig. 3 that pistons 141' and 161' of the servomotors 142' and 162', as used with the embodiment of Fig. 1, are connected through their piston rods 143' and 163', and levers 145' and 165' with the respective transmission clutch operating shafts 204 and 209.

Similarly in the embodiment of Fig. 2 the corresponding servomotor pistons 141 and 161 can be attached to the respective shafts 204 and 209. That is to say, both embodiments of the invention are adapted to operate with the same transmission. It is to be understood, however, that the invention is not to be taken as limited to the particular arangements shown since it is well known in the art to utilize fluid pressure to any suitable number of servomotors to shift the gears in various types of transmissions including those not necessarily of the claw clutch type.

A particular advantage as regards safety results, in the described arrangement, from the fact that at any setting all distributor slide valves are set by the pressure medium so far as they are not already held in the proper position by spring force.

The valves moved by pressure medium are caused to operate whenever a certain higher pressure acts on one side against a lower pressure acting on the other side, as is well known in the art. Using spring pressure in addition, as shown in the drawings, means simplification in so far as fewer pressure air conduits are required.

I do not want to be limited to the details described or represented in the drawings as many variations will occur to those skilled in the art.

What I claim is:

1. A control device for pressure operated gear shifting mechanism in motor vehicles comprising a first valve adapted to control the flow of pressure to the gear shifting mechanism, means for setting said valve at will, a second valve operating in dependency on the gas control of the motor, a third valve adapted to be operated by the pressure controlled by said second valve, said third valve controlling the admission of pressure to said first valve, a piston for actuating said third valve, said piston being adapted to be operated by the pressure controlled by said second valve, and a pin adapted to transmit movement from said piston to said third valve, a fourth valve adapted to admit pressure to said piston, and a pressure operated auxiliary device for influencing the speed of the gear clutch to be engaged, said fourth valve being adapted to be operated by the pressure acting on said auxiliary device.

2. A control device for pressure-operated gear shifting mechanism in a motor vehicle comprising a pressure supply for operating the gear shifting mechanism, a gas pedal for the vehicle motor movable in a path, and control means controlling the supply of operating pressure to the gear shifting mechanism operating in dependency on movement of said gas pedal and being operative to cause pressure to be supplied to the gear shifting mechanism only when the gas pedal is at an intermediate position in its path of movement.

3. A control device for pressure-operated gear shifting mechanism in a motor vehicle comprising a pressure supply for operating the gear shifting mechanism, a first valve means controlling the distribution of pressure to the gear shifting mechanism for various gear selections, means for setting said distributor valve means for the various gear selections, and control mechanism controlling the supply of pressure to said distributor valve means including a service lever movable in a path, a second valve means actuatable by said service lever through pressure which is supplied only when said service lever moves to a point intermediate the ends of its path of movement, and a third valve means controlled by the pressure supplied through the second valve means operating to control the flow of pressure to the distributor valve means.

4. A control device for pressure-operated gear shifting mechanism in a motor vehicle comprising a pressure supply, a distributor valve means controlling the flow of pressure from the pressure supply to the gear shifting mechanism for various gear selections, a service lever movable forward and backward in a fixed path, and control means operating in dependency on the service lever controlling the flow of pressure from the supply to the distributor valve means, said control means cutting off the flow of pressure to the distributor valve means when the service lever is at each end of its path of movement, and said control means being operative to momentarily supply pressure to the distributor valve means during movement of the lever both forwardly and backwardly when the lever reaches an intermediate position in its path of movement.

5. A control device for pressure operated gear shifting mechanism in a motor vehicle comprising a pressure supply, a pressure actuating valve means controlling the flow of pressure from the supply to the gear shifting mechanism, a service lever movable in a path, and control means operating in dependency on movement of the service lever controlling the supply of operating pressure for said valve means, said control means being operative to open said valve means only when the service lever is at an intermediate position in its path of movement.

6. In a control device controlling the supply of pressure to pressure operated gear shifting mechanism in a motor vehicle, a service lever movable backwards and forwards in a fixed path, a pressure control valve movable between two end positions, said valve being open at a point in its movement intermediate its end positions to permit the flow of pressure therethrough and being closed in each of its end positions to cut off the flow of pressure, and connecting means between the service lever and said valve causing the service lever during movement in its path to move the valve from one to the other of the end positions of the valve and causing said valve to be momentarily opened during its course of movement when the service lever is at an intermediate position in its path of movement.

7. A control device as in claim 3 including the feature that of said second and third valve means one comprises a valve movable between two end positions, said valve opening to permit the flow of pressure therethrough at a point in its movement intermediate its end positions and being closed to cut off the flow of pressure in each of its end positions.

8. A control device as in claim 3 further including the feature that the pressure supplied through the second valve means acts on a piston, and that movement of said piston is transmitted through a pin to the third valve means and serves to open the third valve means.

9. A control device for pressure operated gear shifting mechanism in motor vehicles comprising a first valve controlling the distribution of pressure to the gear shifting mechanism, means for setting said first valve at will, a service lever movable in a path, a second valve operating in dependency on said lever, a third valve controlling the flow of pressure to the first valve, said third valve being adapted to be operated by the pressure controlled by the second valve, a piston actuable by the pressure controlled by the second valve operative to move the third valve to open position, a fourth valve operating independently of the second valve to supply pressure to said piston and adapted to cause said piston to hold the third valve open, and a pressure operated auxiliary device for influencing the speed of the gear clutch to be engaged, said fourth valve being actuable by the pressure acting on said auxiliary device.

KARL MAYBACH.